US007228388B2

(12) United States Patent
Hu et al.

(10) Patent No.: US 7,228,388 B2
(45) Date of Patent: Jun. 5, 2007

(54) ENABLING AND DISABLING CACHE BYPASS USING PREDICTED CACHE LINE USAGE

(75) Inventors: Zhigang Hu, Ossinging, NY (US); John T. Robinson, Yorktown Heights, NY (US); Xiaowei Shen, Hopewell Junction, NY (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 10/993,531

(22) Filed: Nov. 19, 2004

(65) Prior Publication Data

US 2006/0112233 A1   May 25, 2006

(51) Int. Cl.
   *G06F 12/00*   (2006.01)
(52) U.S. Cl. ...................... 711/138; 711/122
(58) Field of Classification Search ................ 711/118, 711/122, 138
   See application file for complete search history.

(56) References Cited

U.S. PATENT DOCUMENTS

| 5,625,793 A  * | 4/1997 | Mirza .......................... 711/138 |
| 5,729,713 A    | 3/1998 | Leyrer |
| 6,356,980 B1 * | 3/2002 | Arimilli et al. ............. 711/138 |
| 6,647,466 B2 * | 11/2003 | Steely, Jr. ................... 711/138 |

OTHER PUBLICATIONS

C.-H. Chi and H. Dietz, "Unified Management of Registers and Cache Using Liveness and Cache Bypass" PLDI '89: Proceedings of the ACM SIGPLAN 1989 Conference on Programming language design and implementation, 1989, 344-353, ACM Press, Portland, Oregon, United States.

Y. Wu, R. Rakvic, L.-L. Chen, C.-C. Miao, G. Chrysos and J. Fang, "Compiler Managed Micro-cache Bypassing for High Perofrmance EPIC Processors" MICRO 35, 2002, 134-145, Istanbul, Turkey, IEEE Computer Society Press.

"Efficient Selective Caching through Lazy Cache Promotion," published electronically at IP.com, document ID IPCOM000008849D, Jul. 17, 2002.

J. Bradley Chen, "Probabilistic Cache Replacement", Technical Report TR-13-95, Harvard University, 1995.

J. A. Rivers and E. S. Davidson, "Reducing conflicts in direct-mapped caches with a temporality-based design," in Proceedings of the 1996 International Conference on Parallel Processing, pp. 151-162, Aug. 1996.

G. Tyson, M. Farrens, J. Matthews, and A. R. Pleszkun, "Managing Data Caches using Selective Cache Line Replacement," Journal of Parallel Programming, vol. 25, No. 3 pp. 213-242, Jun. 1997.

* cited by examiner

*Primary Examiner*—Hiep T. Nguyen
(74) *Attorney, Agent, or Firm*—Ference & Associates LLC

(57) ABSTRACT

Arrangements and method for enabling and disabling cache bypass in a computer system with a cache hierarchy. Cache bypass status is identified with respect to at least one cache line. A cache line identified as cache bypass enabled is transferred to one or more higher level caches of the cache hierarchy, whereby a next higher level cache in the cache hierarchy is bypassed, while a cache line identified as cache bypass disabled is transferred to one or more higher level caches of the cache hierarchy, whereby a next higher level cache in the cache hierarchy is not bypassed. Included is an arrangement for selectively enabling or disabling cache bypass with respect to at least one cache line based on historical cache access information.

21 Claims, 4 Drawing Sheets

ENABLING AND DISABLING CACHE BYPASS USING PREDICTED CACHE LINE USAGE

This invention was made with Government support under Contract No.: NBCH30390004 awarded by the Defense Advanced Research Projects Agency. The Government has certain rights in this invention.

FIELD OF THE INVENTION

The present invention generally relates to the design of multi-level cache architectures in computer systems, and more specifically to the design of such architectures in which cache lines residing in a lower level cache may bypass an intermediate cache in the cache hierarchy when the cache lines are requested by and stored in a higher level cache.

BACKGROUND OF THE INVENTION

One may begin by considering (for example) a computer system with a processor together with L1 (level 1) and L2 (level 2) caches. In the case of an L1 miss, it is clearly advantageous to bypass the L1 and load data from the L2 directly into processor registers in the case that the cache line, if it had been loaded into the L1, would never have been re-used before being replaced. In this example, the processor registers can be thought of as the highest level of the cache hierarchy, that is, as an L0 (level 0) cache. The advantages of bypassing a cache in certain cases have been recognized previously, and a number of techniques proposed for selective cache bypass, as described in more detail below. However, none of this work describes the use of predictive mechanisms at cache line granularity in order to selectively enable and disable cache bypass based on the recent usage history of cache lines for all cache lines residing in the L1 and L2 at any point in time.

In a conventional technique known as lazy cache promotion, two L1 misses for a given line are required before the line is loaded into the L1 (see Efficient Selective Caching through Lazy Cache Promotion, published electronically at IP.com, document ID IPCOM000008849D, Jul. 17, 2002). It is clear that in certain cases this method will lead to decreased system performance, since two misses are required to load a line into the L1 that would more advantageously have been loaded on the first reference; furthermore, usage information is not maintained (that is, when a given line is replaced in the L1, the information that it was previously loaded due to two subsequent misses is discarded).

Compiler-based techniques have also been proposed, that is, compile-time analysis is used to attempt to determine certain variables that map to cache lines which should bypass a cache in the cache hierarchy. Examples include (1) Compiler Managed Micro-cache Bypassing for High Performance EPIC Processors, Wu et al, pages 134-145, Proceedings of the 35th ACM/IEEE International Symposium on Microarchitecture, November 2002, and (2) Unified Management of Registers and Cache Using Liveness and Cache Bypass, Chi and Dietz, pages 344-355, Proceedings of the ACM SIGPLAN Conference on Programming Language Design and Implementation (PLDI), Portland, Oreg., Jun. 21-23, 1989. Possible disadvantages of these approaches include the coupling of compilers and compile-time analysis with details of the system's cache architecture, together with the maintenance and use at run-time by the cache controllers of compiler-generated information associated with particular programs with resulting complexity, together with identification of only a limited set of cache lines for which cache bypass may be advantageous.

Probabilistic methods have also been proposed for use in selective caching. In the publication Probabilistic Cache Replacement, Technical Report TR-13-95, Harvard University, 1995, a method is proposed in which caching of data from main memory is determined by a probabilistic boolean-valued function, where repeated misses to a word in memory increase its probability of being cached. One of the disadvantages of this approach is that multiple misses are required to increase the probability that a given memory word will be cached, which more advantageously could have been cached on the first miss.

Other approaches may be classified as instruction-based methods. Examples include (1) Managing Data Caches using Selective Cache Line Replacement, Tyson et al, International Journal of Parallel Programming, Vol. 25 No. 3, 1997, and (2) Automatic Cache Bypass for Instructions Exhibiting Poor Cache Hit Ratio, Jamshed H. Mirza, U.S. Pat. No. 5,625,793, Apr. 29, 1997. In these approaches, individual instructions may be identified (using offline analysis) and marked for which a performance advantage may be realized by not caching (in the L1) the target of such marked instructions. The possible disadvantages of these approaches are similar to those of compiler-based techniques.

Other related work includes methods in which a data reference pattern is detected. First, in the publication Reducing Conflicts in Direct-Mapped Caches with a Temporality-Based Design, Rivers and Davidson, pages 154-163, Proceedings of the 1996 International Conference on Parallel Processing, August 1996, a cache architecture design is described in which the L1 cache is partitioned into a direct mapped cache and a fully associative cache (used as a buffer); cache lines that are loaded into the direct mapped partition but not re-used before being replaced are tagged and then on subsequent references loaded into the fully associative buffer partition. Some possible disadvantages of this approach are that conflict misses for a given line in the direct mapped partition may be transient (that is, a line may typically be re-used but occasionally not re-used due to a non-recurring conflict), extra complexity associated with the fully associative buffer, possible over-utilization of the fully associative buffer in the case that an excessive number of lines are tagged, and lack of a mechanism for clearing the previously described tags.

Finally, in some cases sequential access by a program to a large array (for example) may cause a cache in the cache hierarchy to be loaded with large amounts of data that are not re-used. If such a pattern can be recognized, the data can bypass the cache. Such a technique is described in Data Processing with First Level Cache Bypassing After a Data Transfer Becomes Excessively Long, Thomas Leyrer, U.S. Pat. No. 5,729,713, Mar. 17, 1998. A primary disadvantage of this approach is that it is equally possible that the sequentially accessed data could be re-used multiple times; for a simple example, consider a program for matrix multiplication of two N×N matrices in which each column and row of the two respective matrices will be accessed N times (and in which the cache is large enough to hold the relevant data).

Accordingly, a need has been recognized in connection with overcoming the shortcomings and disadvantages as described hereinabove with respect to conventional arrangements, and in selectively enabling and disabling cache bypass at cache line granularity for a cache in a multi-level cache hierarchy using predictive mechanisms.

SUMMARY OF THE INVENTION

In accordance with at least one presently preferred embodiment of the present invention, in utilizing recent usage history, predictive mechanisms preferably selectively enable and disable cache bypass at cache line granularity, for all cache lines resident in the cache which may be bypassed and in the next lower-level cache.

In a computer system with a multi-level cache hierarchy, as described above it is desirable to have a cache bypass prediction mechanism that can predict when requested data should bypass a particular cache in the cache hierarchy, in order to improve overall system performance. Consider a computer system that includes level i−1, level i, and level i+1 caches C[i−1], C[i], and C[i+1], respectively. In the case that i=1, the cache C[0] will be considered to include the processor registers. When a cache miss occurs for cache C[i], a cache bypass prediction mechanism predicts whether the requested data should be cached in C[i]. A cache bypass prediction can be made when the processor or a higher level cache issues a cache request, when a C[i] cache miss occurs, or when the cache request is received at the C[i+1] cache. The cache bypass prediction mechanism includes appropriate bypass prediction states that can be maintained at the C[i] cache side, the C[i+1] cache side, or both. The bypass prediction state can be maintained for each C[i] cache line, for each C[i+1] cache line, or both. The bypass prediction state can also be maintained for each memory address, or for each set of memory addresses that are mapped to the same bypass prediction state based on some hashing function (for example).

Generally, the advantage of selectively enabling and disabling L1 cache bypass at cache line granularity using history-based predictive mechanisms increases L1 hit ratios leading to increased processor performance. There may be other advantages as well, for example decreasing the required L1-L2 data transfer bandwidth.

In summary, one aspect of the invention provides a method of enabling and disabling cache bypass in a computer system with a cache hierarchy, the method comprising the steps of: providing an identifying arrangement for identifying cache bypass status with respect to at least one cache line; providing a transferring arrangement which is adapted to: transfer a cache line identified as cache bypass enabled to one or more higher level caches of the cache hierarchy, whereby a next higher level cache in the cache hierarchy is bypassed; and transfer a cache line identified as cache bypass disabled to one or more higher level caches of the cache hierarchy, whereby a next higher level cache in the cache hierarchy is not bypassed; and selectively enabling or disabling cache bypass with respect to at least one cache line based on historical cache access information.

Another aspect of the invention provides a system comprising: a cache hierarchy; a plurality of cache lines associated with the cache hierarchy; an identifying arrangement for identifying cache bypass status with respect to at least one cache line; a transferring arrangement which is adapted to: transfer a cache line identified as cache bypass enabled to one or more higher level caches of the cache hierarchy, whereby a next higher level cache in the cache hierarchy is bypassed; and transfer a cache line identified as cache bypass disabled to one or more higher level caches of the cache hierarchy, whereby a next higher level cache in the cache hierarchy is not bypassed; and an arrangement for selectively enabling or disabling cache bypass with respect to at least one cache line based on historical cache access information.

Furthermore, an additional aspect of the invention provides a program storage device readable by machine, tangibly embodying a program of instructions executable by the machine to perform method steps for enabling and disabling cache bypass in a computer system with a cache hierarchy, the method comprising the steps of: providing an identifying arrangement for identifying cache bypass status with respect to at least one cache line; providing a transferring arrangement which is adapted to: transfer a cache line identified as cache bypass enabled to one or more higher level caches of the cache hierarchy, whereby a next higher level cache in the cache hierarchy is bypassed; and transfer a cache line identified as cache bypass disabled to one or more higher level caches of the cache hierarchy, whereby a next higher level cache in the cache hierarchy is not bypassed; and selectively enabling or disabling cache bypass with respect to at least one cache line based on historical cache access information.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

A first preferred embodiment will be described with respect to three caches at three levels in a cache hierarchy, C[i−1], C[i], and C[i+1], where it is understood that if i=1 then cache C[0] actually is made up of the processor registers.

Figure 1:
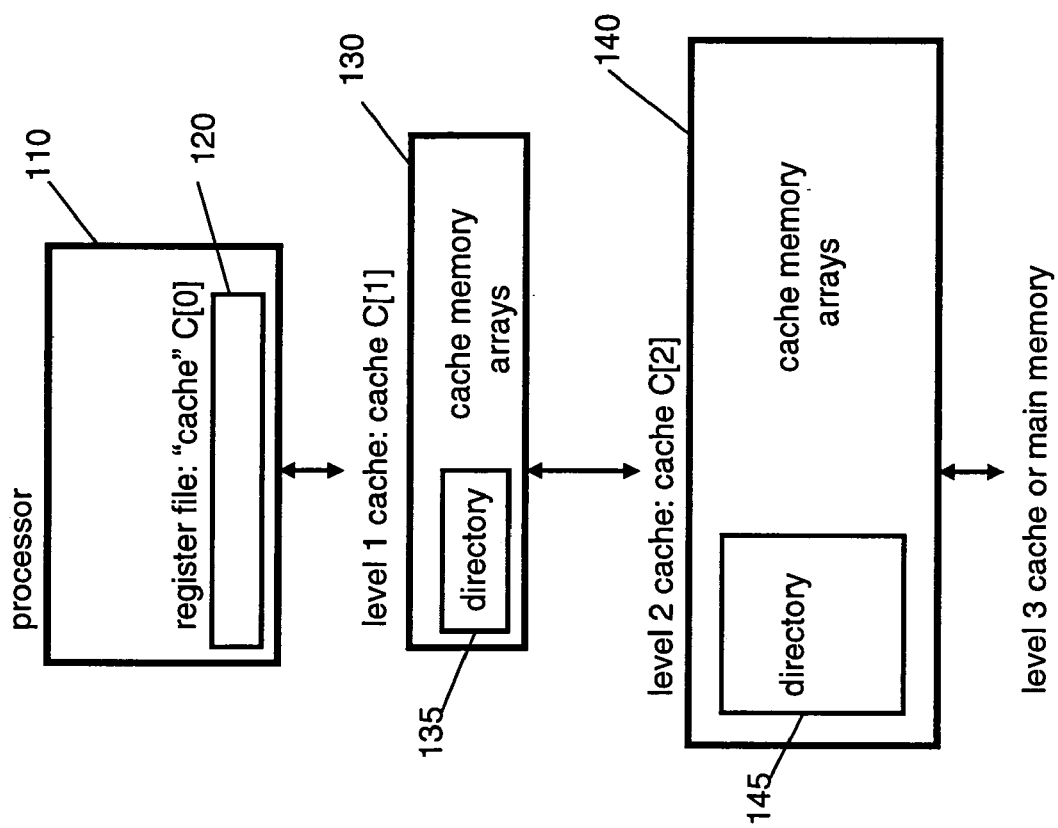
FIG. 1 illustrates a first system with a multi-level cache hierarchy.

The case in which i=1 is illustrated in FIG. 1. In this example "cache" C[0] 120 is made up of the processor register file. Cache bypass involves transferring data requested by an instruction issued by the processor 110 directly from the L2 (level 2) cache C[2] 140 to the register or registers, bypassing the L1 (level 1) cache C[1] 130. This takes place when, as determined by the L1 directory 135 and L2 directory 145, the cache line containing the requested data is resident in the L2 cache C[2] 140 but not resident in the L1 cache C[2] 130.

Figure 2:
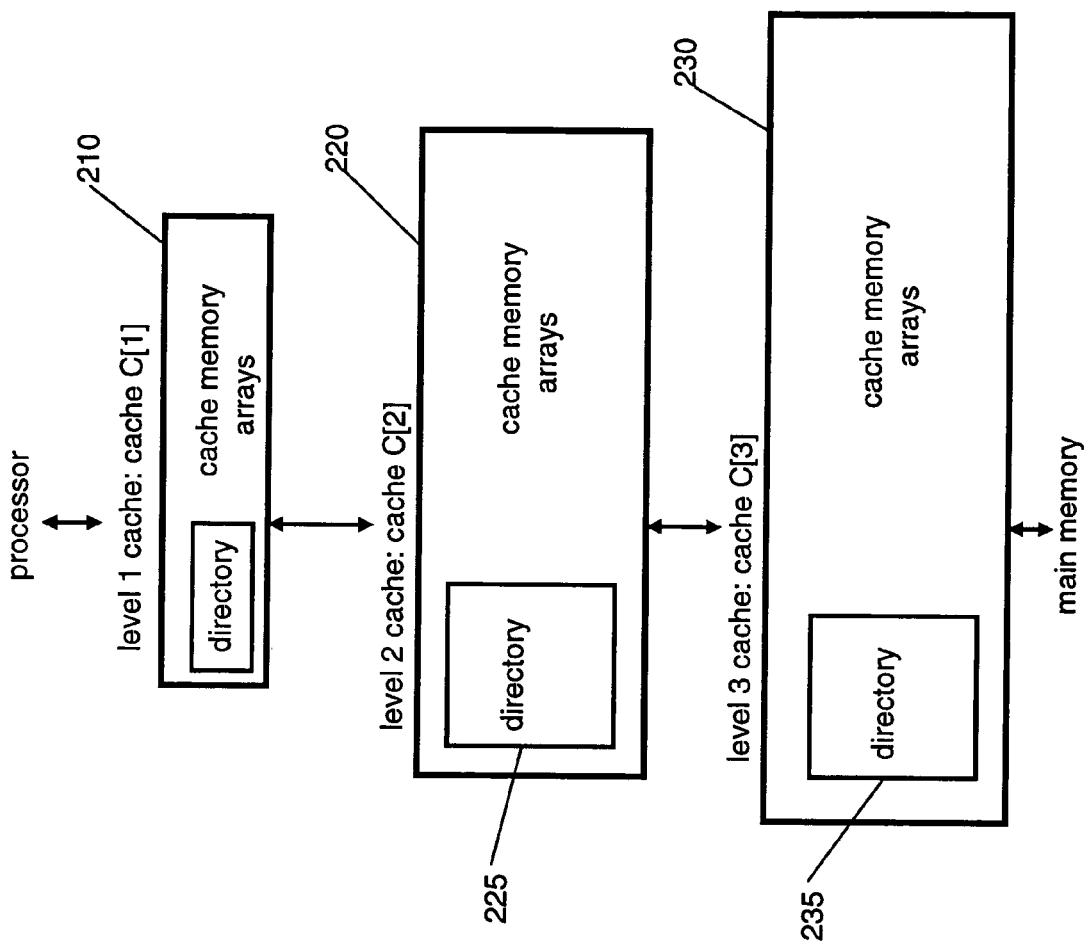
FIG. 2 illustrates a second system with a multi-level cache hierarchy.

FIG. 2 illustrates the case in which i=2. In this example the cache hierarchy includes an L1 (level 1) cache C[1] 210, an L2 (level 2) cache C[2] 220, and an L3 (level 3) cache C[3] 230. Cache bypass involves transferring a cache line requested by cache C[1] 210 due to a cache miss directly from C[3] 230 to C[1] 210 bypassing C[2] 220. This takes place when as determined by the L2 directory 225 and the L3 directory 235, the cache line is resident in C[3] 230 but not resident in C[2] 220.

Figure 3:
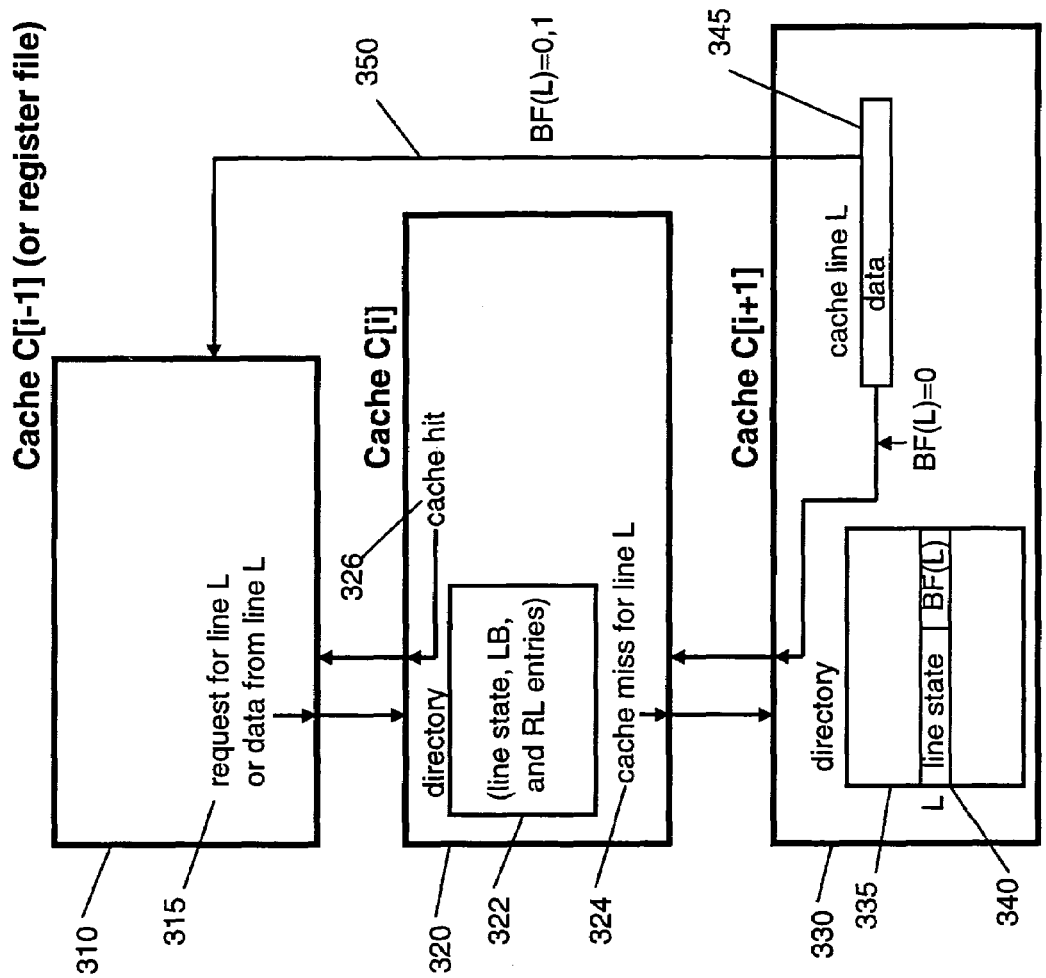
FIG. 3 illustrates a more general case for three levels of a cache hierarchy.

FIG. 3 illustrates the general case in which there are three cache levels in a cache hierarchy C[i−1] 310, C[i] 320, and C[i+1] 330. As described in detail below, in one embodiment of the present invention, predictive mechanisms using replaced line (RL) entries, line bypass (LB) entries, and bypass flag (BF) entries will be used to selectively enable and disable cache bypass. The cache directory 322 for cache C[i] 320 is extended to contain LB and RL entries, and the cache directory 335 for cache C[i+1] is extended to contain BF entries. The LB and RL entries will be used by the predictive mechanism to enable and disable cache bypass at cache line granularity by setting and clearing BF entries, which include a single flag (one bit) entry maintained in directory 335 for each cache line L in cache C[i+1]. Given a request 315 from C[i−1] (due to a cache miss in C[i−1], or in the case that i=1 and C[i−1] include a register file, an instruction requesting data) for line L, cache C[i] 320 is accessed. If the line is resident in C[i] 320 (as determined by the directory 322), then there is a cache hit 326 and the line (or requested data within the line) is transferred from C[i] 320 to C[i−1] 310. Additionally, as described in detail below, an RL entry may be removed from the directory 322. Otherwise, there is a cache miss 324 in C[i] 320 for line L. In this case C[i] 320 issues a request to C[i+1] 330 for line L. Assuming line L is resident in C[i+1] 330 as determined by directory 335, the bypass flag BF(L) found in the directory entry 340 for line L determines whether cache bypass is enabled for line L. In the case that BF(L)=0, cache bypass is not enabled, and line L is transferred to both C[i] 320 and C[i−1] 310 (or, in the case that i=1 and C[i−1] includes a register file, the requested data is transferred). In the case that BF(L)=1, cache bypass is enabled, and as shown in the figure line L (or the data requested from line L) is transferred (350) only to C[i−1] 310. Additionally, in the case of a cache miss 324 for line L in C[i] 320, as described in detail below, the bypass flag for L, BF(L), in directory entry 340 may be set if there is a line bypass entry for L, LB(L), in directory 322.

In more detail, LB and RL entries are maintained in the directory 322 of cache C[i] 320 as follows. For each cache line L that bypasses C[i], a line bypass entry LB(L) is inserted into the directory 322 for line L. This entry contains the tag of line L, together with a counter initialized to 0. Note that if cache C[i] is a K-way set associative cache, then line L, had it been stored in C[i] (rather than bypassing C[i]), would always age out of C[i] after K misses (to lines other than line L, assuming LRU replacement) mapping to the set in which line L would have been stored. If a method other than LRU replacement is used (for example, tree-LRU replacement, or pseudo-random replacement), then line L could age out in less than K misses. In a first embodiment of the present invention, however, the counter for LB(L) will be incremented on every miss (to a line other than line L) to the set in which line L maps, and will be removed from the directory 322 when the counter reaches a value of K. As described below, if there is a miss for line L, the LB(L) entry may be removed before this point. Next, a replaced line entry RL(L',L) is maintained in the directory 322 of cache C[i] 320 for each line L' residing in the cache which replaced a line L when it was loaded in the cache. If line L' is referenced before there is a miss to line L in cache C[i], then the RL(L',L) entry will be removed from the directory. The RL(L',L) entry will also be removed when line L' ages out of the cache C[i], and (as described in detail below) if there is a miss to line L. Finally, bypass flags BF(L) are maintained in directory 335 as part of the cache directory entry 340 for each line L in cache C[i+1] 330. As described below, the bypass flag entries determine whether cache lines residing in C[i+1] 330 bypass cache C[i] 320 in the cache hierarchy. When a new line L is loaded into cache C[i+1] (due to a miss for L in C[i+1]), the bypass flag BF(L) for L may be initialized to 0 (bypass disabled for line L) or 1 (bypass enabled for L). In a first embodiment BF(L) will be initialized to 0 (bypass initially disabled for each new cache line L loaded into C[i+1]).

Figure 4:
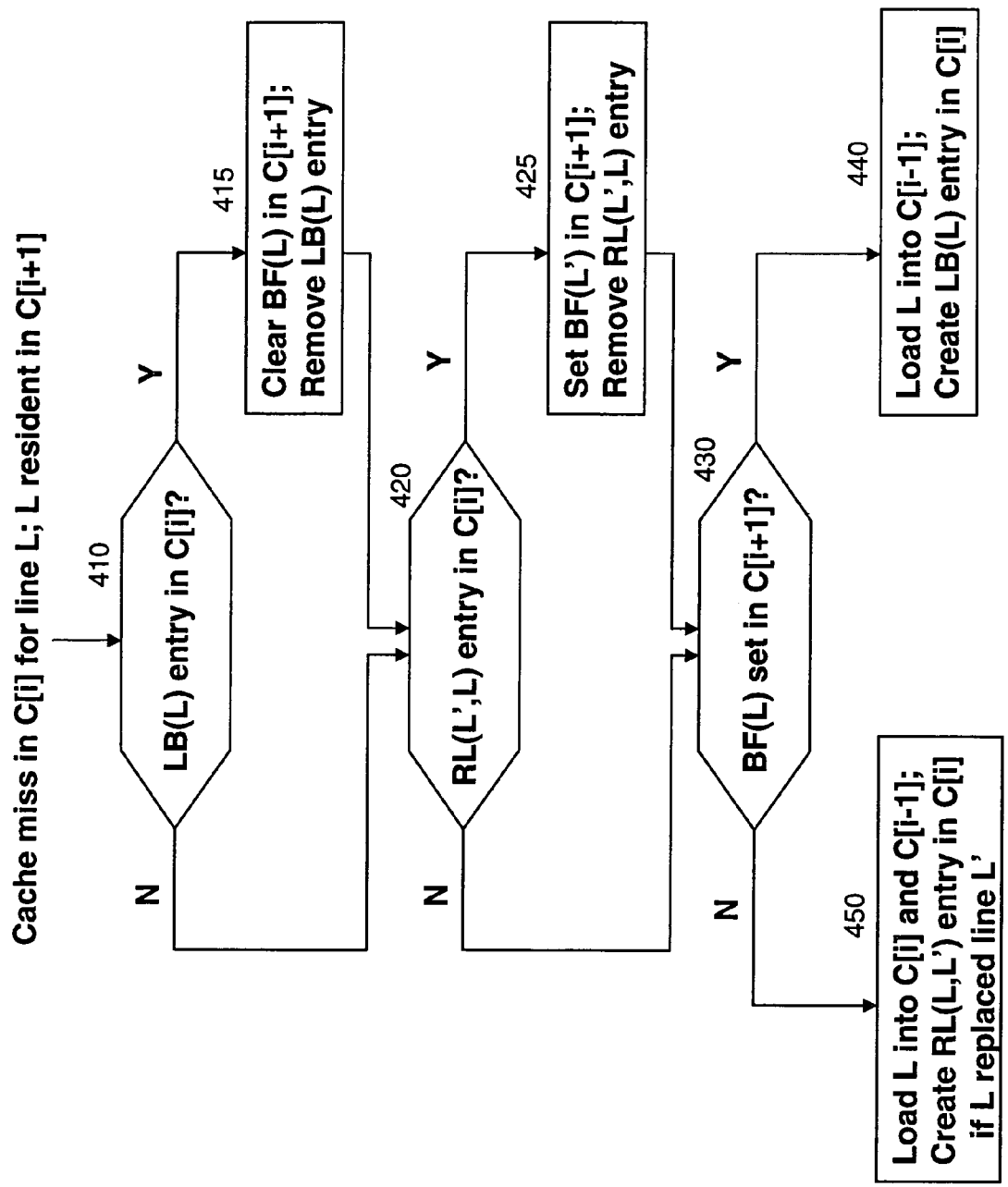
FIG. 4 illustrates control flow for cache bypass at cache line granularity.

Given the preceding, the operation of a first embodiment of the present invention can now be described with reference to FIG. 4. Given a cache miss in cache C[i] for line L, where line L resides in cache C[i+1], first it is determined if there is an LB(L) entry for line L in the directory for cache C[i], as shown in step 410. If so, the BF(L) entry for L is cleared in the directory for cache C[i+1], and the LB(L) entry is removed in the directory for cache C[i], as shown in step 415. In either case control proceeds to step 420, in which it is determined if there is an RL(L'L) entry in the directory for cache C[i]. If so, the bypass flag BF(L') is set for line L' in the directory for cache C[i+1], and the RL(L',L) entry is removed in the directory for cache C[i], as shown in step 425. In either case, control proceeds to step 430, in which it is determined if the bypass flag BF(L) is set for line L in the directory for cache C[i+1]. If so, line L is loaded in cache C[i−1] (or in the case that i=1 and C[0] includes processor registers, the requested data is loaded), bypassing cache C[i], and a line bypass entry LB(L) is created for line L in the directory for cache C[i], as shown in step 440. If the bypass flag BF(L) was found not set in step 430, then line L is loaded into both caches C[i] and C[i−1] (where again, if it is the case that i=1 and cache C[0] includes processor registers, only the requested data is loaded into the register or registers), and if line L, when loaded into C[i], replaces a line in C[i] L', then a replaced line entry RL(L,L') is created in the directory for C[i], all of which is indicated in step 450.

Within the scope of the present invention, a number of design alternatives (or variant embodiments) are possible. For example, since the LB(L) and RL(L',L) entries are used as predictors, an implementation alternative is store a subset of the tag bits for the cache line L in these entries. In this case a match of the corresponding subset of tag bits for line L (as in FIG. 4) indicates that line L bypassed the cache, or was replaced in the cache, with high probability. Since these are used for predictors, the system operates correctly even in the rare case of a false match.

As yet another example, rather than setting the bypass flag for a given cache line L using replaced line entries (as in the control flow shown in FIG. 4), the bypass flag BF(L) for line L stored in the directory 335 (FIG. 3) for cache C[i+1] 330 can be set if cache line L ages out of cache C[i] without being re-referenced. This can be determined using a one bit re-reference flag RR(L) stored in the directory entry for line L in cache C[i].

Yet another variation would be to set the bypass flag BF(L) for line L only after M consecutive instances of no re-use of line L in cache C[i]. In more detail, a bypass counter BC(L) is stored in the directory entry for each line L residing in cache C[i+1], initialized to 0. Each time a given line L ages out of cache C[i] without being re-referenced in C[i], the counter BC(L) is incremented. If BC(L) is incremented and is then equal to M (where M is greater than or equal to 1), then BF(L) is set. Conversely, if a given line L residing in cache C[i] is re-referenced, then the counter BC(L) is set to 0. The resulting mechanism is a threshold method in which M consecutive instances of no re-use in cache C[i] are required to enable cache bypass. An important principle of these and other conceptually similar methods for setting cache bypass for a given line L is to predict, using usage history for the line L, whether cache performance would be improved if cache bypass were enabled for the given line L. In the case of the use of replaced line entries RL(L,L'), in some cases it is determined that loading L caused a miss to a line L' that would not have occurred had line L bypassed the cache, and that there was no prior cache hit to line L; therefore the cache performance would have been improved if cache bypass had been enabled for line L. In the case of methods that determine whether line L is subsequently re-referenced, the improved performance (in the case that the prediction is accurate) rely on avoiding loading lines that are not subsequently re-used, effectively increasing the cache size and avoiding unnecessary traffic between levels of the cache hierarchy. In this context, threshold methods may be used to improve the accuracy of prediction, that is, a repeated pattern of no re-use is required to enable cache bypass for a given line.

A threshold method can also be used for determining when to disable cache bypass for a given line L which currently has cache bypass enabled (that is, BF(L) is set for the line L). In this method, a miss counter MC(L) is stored in the directory entry for each line L residing in cache C[i+1], initialized to 0 when the bypass flag for line L, BF(L), is set. On each miss for line L occurring in C[i] for which there exists a line bypass entry LB(L), the miss counter MC(L) for line L is incremented. If the counter MC(L) reaches a value of N (where N is greater than or equal to 1), then the bypass flag for L, BF(L), is cleared, and the counter MC(L) is re-set to 0. The principle of these and other conceptually similar methods is to clear cache bypass for a given line which would have been referenced in the next higher-level cache, or for the case in which N is 2 or greater, in which there is a repeated pattern of such misses, had cache bypass not been enabled for the given line.

Other conceivable variants for determining when to disable cache bypass for a given line L which currently has cache bypass enabled (that is, BF(L) is set for the line L) include methods which rely on recency information. For example, if there is a cache miss for line L in C[i] with BF(L) set in C[i+1] and line L is found to be in the MRU (most recently used) position in the set to which it maps in cache C[i+1] (assuming C[i+1] is configured as a set-associative cache with least recently used replacement within each set), then the bypass flag for line L, BF(L), is cleared. As is known, recency of usage can also be determined using counter-based methods. An important principle of these and other conceptually similar methods is to clear cache bypass for lines which are repeatedly requested from C[i+1] within short intervals of time, since such lines would more advantageously have been cached in the next higher level of the cache hierarchy.

It is to be understood that the present invention, in accordance with at least one presently preferred embodiment, includes: an identifying arrangement for identifying cache bypass status; a transferring arrangement which is adapted to: transfer a cache line identified as cache bypass enabled to one or more higher level caches of said cache hierarchy, whereby a next higher level cache in the cache hierarchy is bypassed; and transfer a cache line identified as cache bypass disabled to one or more higher level caches of said cache hierarchy, whereby a next higher level cache in the cache hierarchy is not bypassed; and an arrangement for selectively enabling or disabling cache bypass with respect to at least one cache line based on historical cache access information. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of enabling and disabling cache bypass in a computer system with a cache hierarchy, said method comprising the steps of:
   providing an identifying arrangement for identifying cache bypass status with respect to at least one cache line;
   providing a transferring arrangement which is adapted to:
      transfer a cache line identified as cache bypass enabled to one or more higher level caches of the cache hierarchy, whereby a next higher level cache in the cache hierarchy is bypassed; and
      transfer a cache line identified as cache bypass disabled to one or more higher level caches of the cache hierarchy, whereby a next higher level cache in the cache hierarchy is not bypassed; and
   selectively enabling or disabling cache bypass with respect to at least one cache line based on historical cache access information.

2. The method according to claim 1, wherein said step of selectively enabling or disabling comprises enabling cache bypass responsive to determining that a cache line is not re-referenced at a given single level of the cache hierarchy.

3. The method according to claim 1, wherein said step of selectively enabling or disabling comprises enabling cache bypass for a first cache line responsive to determining that the first cache line has replaced a second cache line that was re-referenced prior to the first cache line being re-referenced.

4. The method according to claim 1, wherein said step of selectively enabling or disabling comprises disabling cache bypass responsive to determining, for a given cache line, that the cache line would have been referenced in the next higher level cache if cache bypass had not been enabled for the given cache line.

5. The method according to claim 1, wherein said step of selectively enabling and disabling comprises applying a threshold to determine when to disable cache bypass for a given cache line that is bypass-enabled.

6. The method according to claim 5, wherein said step of applying a threshold comprises:
   storing a miss counter for each line of a cache;
   initializing the miss counter to zero;
   incrementing the miss counter responsive to misses in the corresponding line; and
   disabling cache bypass when the miss counter is incremented to a predetermined threshold.

7. The method according to claim 1, wherein said step of selectively enabling and disabling comprises employing recency information to determine when to disable cache bypass for a given cache line that is bypass-enabled.

8. The method according to claim 7, wherein said step of employing recency information comprises disabling cache bypass for a most recently used cache line.

9. The method according to claim 1, wherein said step of selectively enabling and disabling comprises applying a threshold to determine when to enable cache bypass for a given cache line that is bypass-disabled.

10. The method according to claim 9, wherein said step of applying a threshold comprises:
storing a bypass counter for each line of a cache;
initializing the bypass counter to zero;
incrementing the bypass counter responsive to instances of no re-use in the corresponding line; and
enabling cache bypass when the bypass counter is incremented to a predetermined threshold.

11. A system comprising:
a cache hierarchy;
a plurality of cache lines associated with said cache hierarchy;
an identifying arrangement for identifying cache bypass status with respect to at least one cache line;
a transferring arrangement which is adapted to:
transfer a cache line identified as cache bypass enabled to one or more higher level caches of said cache hierarchy, whereby a next higher level cache in the cache hierarchy is bypassed; and
transfer a cache line identified as cache bypass disabled to one or more higher level caches of said cache hierarchy, whereby a next higher level cache in the cache hierarchy is not bypassed; and
an arrangement for selectively enabling or disabling cache bypass with respect to at least one cache line based on historical cache access information.

12. The system according to claim 11, wherein said arrangement for selectively enabling or disabling comprises enabling cache bypass responsive to determining that a cache line is not re-referenced at a given single level of said cache hierarchy.

13. The system according to claim 11, wherein said arrangement for selectively enabling or disabling is adapted to enable cache bypass for a first cache line responsive to determining that the first cache line has replaced a second cache line that was re-referenced prior to the first cache line being re-referenced.

14. The system according to claim 11, wherein said arrangement for selectively enabling or disabling is adapted to disable cache bypass responsive to determining, for a given cache line, that the cache line would have been referenced in the next higher level cache if cache bypass had not been enabled for the given cache line.

15. The method according to claim 11, wherein said arrangement for selectively enabling and disabling is adapted to apply a threshold to determine when to disable cache bypass for a given cache line that is bypass-enabled.

16. The system according to claim 15, wherein said arrangement for selectively enabling and disabling is adapted to:
store a miss counter for each line of a cache;
initialize the miss counter to zero;
increment the miss counter responsive to misses in the corresponding line; and
disable cache bypass when the miss counter is incremented to a predetermined threshold.

17. The system according to claim 11, wherein said arrangement for selectively enabling and disabling is adapted to employ recency information to determine when to disable cache bypass for a given cache line that is bypass-enabled.

18. The system according to claim 17, wherein said arrangement for enabling and disabling is adapted to disable cache bypass for a most recently used cache line.

19. The system according to claim 11, wherein said arrangement for selectively enabling and disabling is adapted to apply a threshold to determine when to enable cache bypass for a given cache line that is bypass-disabled.

20. The system according to claim 19, wherein said arrangement for selectively enabling and disabling is adapted to:
store a bypass counter for each line of a cache;
initialize the bypass counter to zero;
increment the bypass counter responsive to instances of no re-use in the corresponding line; and
enable cache bypass when the bypass counter is incremented to a predetermined threshold.

21. A program storage device readable by machine, tangibly embodying a program of instructions executable by the machine to perform method steps for enabling and disabling cache bypass in a computer system with a cache hierarchy, said method comprising the steps of:
providing an identifying arrangement for identifying cache bypass status with respect to at least one cache line;
providing a transferring arrangement which is adapted to:
transfer a cache line identified as cache bypass enabled to one or more higher level caches of the cache hierarchy, whereby a next higher level cache in the cache hierarchy is bypassed; and
transfer a cache line identified as cache bypass disabled to one or more higher level caches of the cache hierarchy, whereby a next higher level cache in the cache hierarchy is not bypassed; and
selectively enabling or disabling cache bypass with respect to at least one cache line based on historical cache access information.

* * * * *